J. B. MASON, Jr.
AUTOMOBILE BUMPER.
APPLICATION FILED JUNE 22, 1920.

1,367,411. Patented Feb. 1, 1921.

Inventor,
J. B. Mason, Jr.
by Baldwin Wight
his Atty.

UNITED STATES PATENT OFFICE.

JAMES BRUCE MASON, JR., OF NASHVILLE, TENNESSEE.

AUTOMOBILE-BUMPER.

1,367,411.  Specification of Letters Patent.  Patented Feb. 1, 1921.

Application filed June 22, 1920. Serial No. 390,940.

*To all whom it may concern:*

Be it known that I, JAMES B. MASON, Jr., a citizen of the United States, residing at Nashville, in the county of Davidson and State of Tennessee, have invented certain new and useful Improvements in Automobile-Bumpers, of which the following is a specification.

This invention relates to automobile bumpers of the kind in which the bumper is spring-supported or provided with cushioning means whereby the shock of a collision is to some extent reduced.

According to my present invention, I provide the bumper bar with rearwardly extending arms which are rigidly attached to the bar and which operate telescopically in brackets attached to the car springs or to other parts of the automobile frame. The arms are guided in the brackets and between the brackets and the bar, I interpose curved, metallic springs which bear against the front of the brackets and have a sliding engagement at their ends with the rear face of the bumper bar.

In the accompanying drawings:—

The bumper bar A may be of any usual form. It is provided with two rearwardly extending arms B which may be attached to the bar in any suitable way, preferably in the manner shown.

Each arm B supports a spring C which is a curved, metallic spring having an opening $c$ through which the arm B extends, and having at each end a shoe $x$ which is adapted to engage the bar A and to have a sliding connection therewith endwise of the bar.

Each arm B extends into a socket $d$ in a bracket D which is adapted to be secured to the frame of an automobile. As shown, it is secured to one of the springs E thereof by bolts $e$. The socketed portion of each bracket is formed with elongated, longitudinal slots $f$ adapted to receive a cross pin $g$, which pin is adapted to pass through a hole $b$ in the arm B. When assembling the parts after the arms B are attached to the bar they are passed through the holes $c$ in two curved springs C and each arm is then passed into a socket $d$ of one of the brackets, then the pin $g$ is inserted and when this is done at each end of the bar the latter is properly supported and the springs are held in place and cannot be detached from the brackets or from the bar. But inasmuch as the springs can yield and their ends can slide on the bar, and inasmuch as the arms can move endwise in the sockets, a strong and efficient cushion for the bumper bar is provided.

Figure 1:
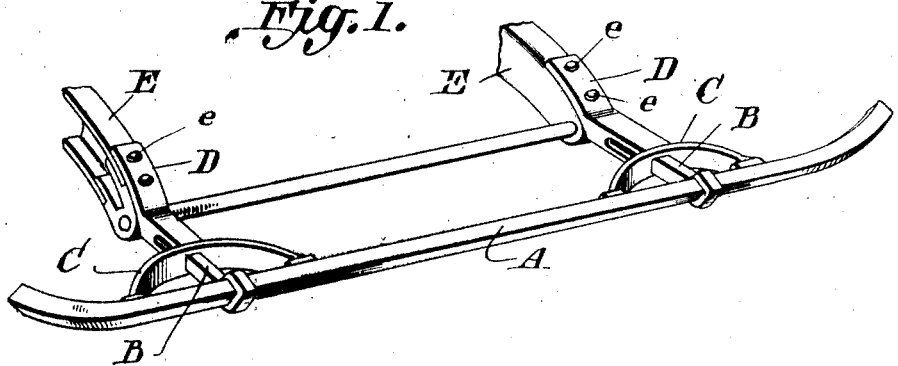
Figure 1 is a perspective view of a bumper embodying my improvements, showing how it may be attached to an automobile.
Figure 2:
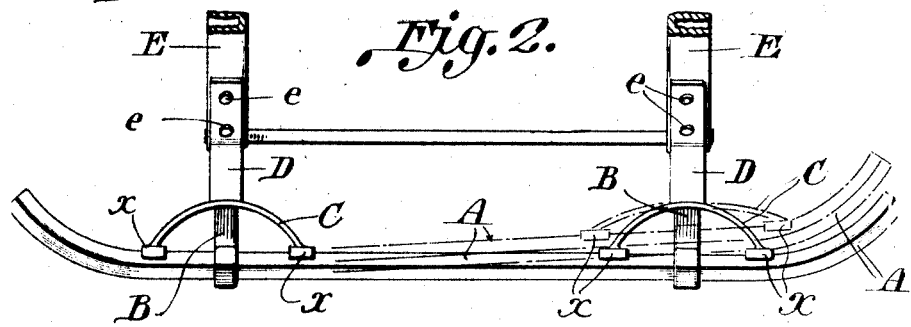
Fig. 2 is a plan view of the same, and illustrates the action of the cushioning devices under certain condition.
Figure 3:
Fig. 3 is a detail sectional view, showing how the rearwardly extending arms of the bumper bar are guided and held in the brackets which support them.
Figure 4:
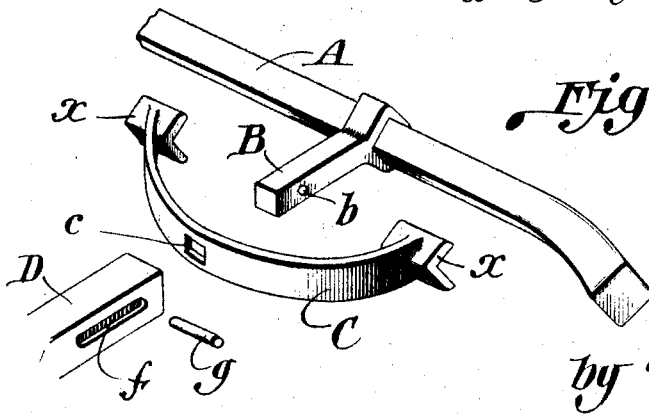
Fig. 4 is a perspective view, showing separately a bumper bar with its arm, the spring which engages the bumper bar and the bracket into which the arm of the bar extends.

Fig. 2 indicates a change in position of the parts which would occur if one end of the bumper came in contact with an obstruction, and it will be observed that the spring readily adapts itself to the conditions, being flattened out to some extent, the shoes $x$ sliding on the bar in such manner as to prevent any undue strain on the springs. The springs are so constructed as to return the bar to normal position when the obstruction is removed.

I claim as my invention:

1. An automobile bumper, comprising a bumper bar having rearwardly extending arms, curved metallic springs through which the arms extend and which have shoes at their outer ends having a sliding connection with the bar, and means for supporting the arms from the frame of an automobile.

2. An automobile bumper, comprising a bumper bar having rearwardly extending arms, curved metallic springs through which the arms extend and which have at their outer ends shoes having a sliding engagement with the bar, brackets having sockets into which the arms extend and in which they slide, and means for holding the arms in the sockets.

3. An automobile bumper, comprising a bumper bar having rearwardly extending arms, curved metallic springs through which the arms extend and in which they are free to move, shoes on the outer ends of the springs engaging the bumper bar, brackets for attaching the bumper to the frame of an automobile and which have sockets that receive the rear ends of the arms, and means for holding the arms in the sockets but which permit the arms to slide in the sockets.

In testimony whereof I have hereunto subscribed my name.

JAMES BRUCE MASON, Jr.